INVENTOR.
Henry C. Lang
BY Joseph Zallen
ATTORNEY

Sept. 14, 1954 H. C. LANG 2,689,016

SOUND REPRODUCING SYSTEM

Filed April 14, 1953 8 Sheets-Sheet 2

INVENTOR.
Henry C. Long
BY Joseph Zeller
ATTORNEY

Sept. 14, 1954 H. C. LANG 2,689,016

SOUND REPRODUCING SYSTEM

Filed April 14, 1953 8 Sheets-Sheet 3

INVENTOR.
Henry C. Lang
BY Joseph Zallen
ATTORNEY

Sept. 14, 1954 H. C. LANG 2,689,016

SOUND REPRODUCING SYSTEM

Filed April 14, 1953 8 Sheets-Sheet 4

INVENTOR.
Henry C. Lang

BY [signature]
ATTORNEY

Sept. 14, 1954 H. C. LANG 2,689,016

SOUND REPRODUCING SYSTEM

Filed April 14, 1953 8 Sheets-Sheet 5

INVENTOR.
Henry C. Lang
BY [signature]
ATTORNEY

Sept. 14, 1954 H. C. LANG 2,689,016

SOUND REPRODUCING SYSTEM

Filed April 14, 1953 8 Sheets-Sheet 6

INVENTOR.
Henry C. Lang

BY Joseph Zallen
ATTORNEY

INVENTOR.
Henry C. Lang
BY
Joseph Zallen
ATTORNEY

Sept. 14, 1954 H. C. LANG 2,689,016

SOUND REPRODUCING SYSTEM

Filed April 14, 1953 8 Sheets-Sheet 8

INVENTOR.
Henry C. Lang

BY [signature]
ATTORNEY

UNITED STATES PATENT OFFICE 2,689,016

SOUND REPRODUCING SYSTEM

Henry C. Lang, Watertown, Mass.

Application April 14, 1953, Serial No. 348,770

6 Claims. (Cl. 181—31)

This invention relates to sound reproducing systems which suppress self-generated harmonic distortion.

In the art of sound reproduction the desired end is to have an output of sound which faithfully reproduces the input. The input is typically converted into electrical energy, amplified by the electrical system and then converted back into sound. This invention is concerned with the distortion occurring in this reconversion of the electrical energy back into sound energy.

Various types of electrical to sound converters have been described and commonly referred to as loud-speakers. These are generally grouped according to design as being either magnetic-diaphragm speakers, condenser speakers, magnetic-armature speakers or moving coil speakers. Speakers vary as to frequency range of faithful reproduction. The inexpensive speakers of the moving-coil-cone type, for example, wherein a small diameter voice-coil is spaced in a direct current magnetic field and coupled directly to a compliant cone, have low-frequency distortion. The cone-coil is held loosely in a supporting frame by a compliant suspension which allows for maximum response in the cone. At low frequencies the variable compliance of the suspension, the non-linearity of the magnetic field, and the standing waves in the cone itself give rise to a self-generated harmonic distortion. In general previously described loud-speakers need large size components and elaborate quality control in order to avoid self-generated harmonic distortion at their lower frequencies.

There have been proposals for loud-speaker enclosures to reduce or remove low frequency distortion. One such proposal provides for the mounting of a loud-speaker through the wall of an enclosure having a vent or port to the atmosphere. By proper choice of dimensions this vented enclosure permits some use of back radiation and permits increased loading of the loud-speaker in the vicinity of its resonant frequencies. However, in such a system the sound radiating from the port is nearly out of phase with that radiating from the speaker face at the lower resonant point, with the result that partial or complete cancellation of the sound occurs in that region. Further, at the upper resonant point the two sources of radiation act in phase, resulting in an augmented response in that region.

In another proposal a combination of two vented chambers is used instead of the one vented chamber. In this case however, there is also double radiation with attendant cancellation at the low frequency region.

In general the problem of harmonic distortion is particularly acute with small speakers in the very low frequency range, since the non-linearities of the loud-speaker and its suspension then become prominent. To my knowledge none of the proposals that have been previously described are effective in suppressing self-generated harmonic distortion in small speakers at low audio frequencies.

One object of this invention is to provide a sound reproducing system which has a substantially flat frequency response and eliminates the harmonic distortion generated by loud-speakers at their low audio frequencies.

Another object of this invention is to provide a sound reproducing system which has a substantially flat frequency response at low audio frequencies.

A further object of this invention is to provide a distortion-free loud-speaker system having a substantially flat frequency response, and capable of utilizing small, inexpensive and low quality control loud-speakers.

A still further object of this invention is to provide such a system as described, whose space requirements are much less than previously described high quality sound reproducing systems.

What I have discovered is that if I place any type of loud-speaker through one wall of a totally enclosed rigid wall chamber and allow it to face directly into another rigid wall chamber which has a port and is acoustically tuned to from one-half to twice the resonant frequency of the combination of the enclosed chamber and the speaker I can substantially eliminate all the harmonic distortion generated by the speaker. I have further found that this distortion suppression is even more pronounced if the port is on a wall which is not opposite the loud-speaker radiating surface. In addition, I have found that even more distortion suppression takes place when the wall opposite the radiating surface has no port and has its inner surface covered with a sound absorbent material.

I have found, in addition, that there is a wide flexibility in design of embodiments of this invention. For example, if I reverse the normal face of the loud-speaker so that the back surface of the speaker now faces into the vented chamber, the sound quality and harmonic distortion suppression will be about the same as if the back of the speaker faced into the total enclosure. Further, the sound reproducing systems of this invention can be made in various sizes and shapes, the only limitation in addition to the acoustic tuning specified above being that the ratio of the volume of the vented enclosure to the port area must exceed the square root of the port area.

In using the term "port" I intended to include either a single passage to the atmosphere or a somewhat clustered group of such passages, commonly referred to as "multiple holes."

The materials of construction for the enclosures can be widely varied, but should be sufficiently stiff, thick and dense so that there is much less transmission of sound through such materials than through the port in a complete system. The term "rigid" as used in this specification and appended claims is intended to describe materials with just such qualities. Among the common examples of suitable base materials are wood, metal and plastic compositions. The appropriate minimum thicknesses can be easily determined by simple experiment.

In designing a vented enclosure having a resonant frequency of one-half to twice the resonant frequency of the loud-speaker mounted in the wall of the total enclosure, all that need be known are the properties of the speaker (mass, compliance, resistance and resonant frequency), the compliance of the total enclosure and the possible compliances of the projected vented enclosures. With the acoustic and electrical measuring instruments available today it is possible to do this design entirely empirically by varying the volume and port area of the projected vented enclosure until the desired acoustic matching is obtained.

I have found that this design process can be considerably shortened by reference to certain common acoustic calculations. This invention and such calculations can be best understood by reference to several preferred embodiments which are illustrated in the drawings wherein.

Figure 11:
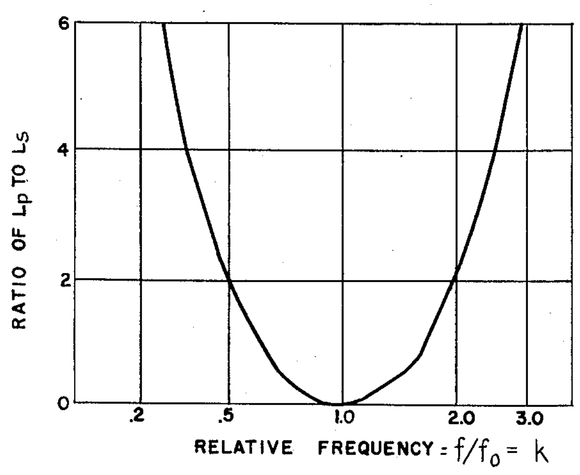

Figure 11 indicates the frequency bands obtainable by varying ratios of air loads.

Figure 1:
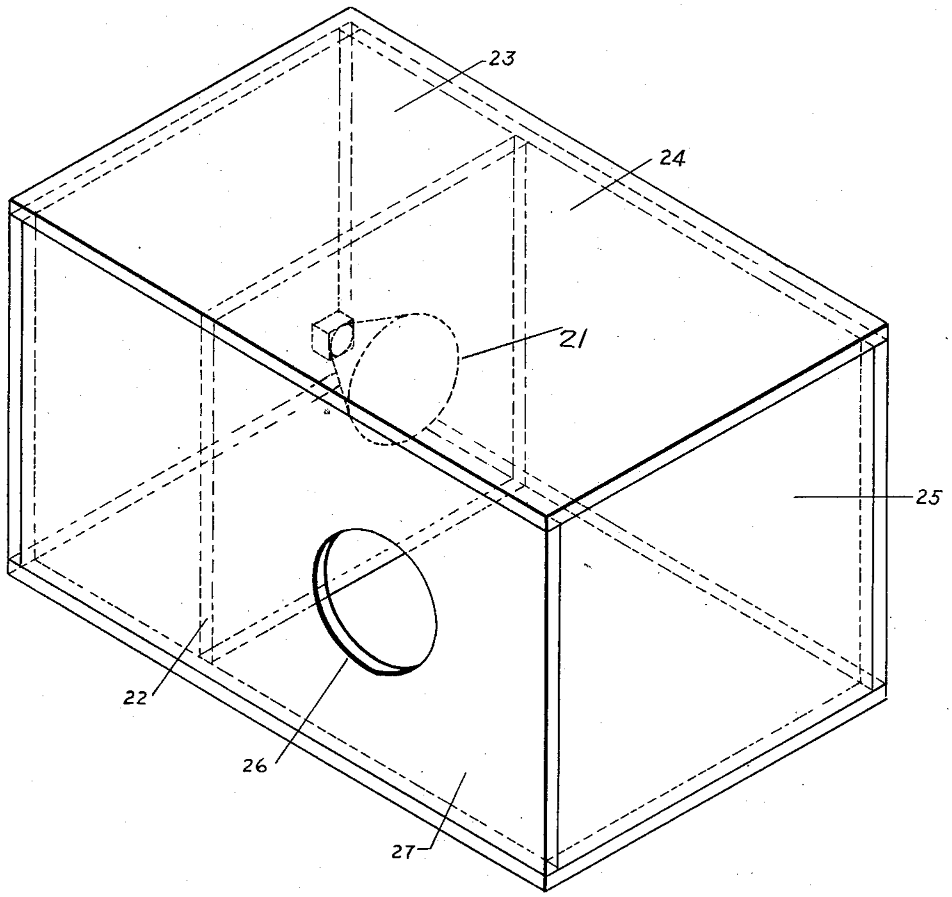
Figure 1 is an embodiment of this invention illustrating a loud-speaker mounted in a total enclosure and facing into an enclosure having a single port.

Referring now to Figure 1 the loud-speaker 21 is a common coil-cone type speaker in which the cone-coil is mounted with an accordion like extension of the compliant cone. The mounting necessarily decreases the total compliance and raises the natural resonant frequency of the speaker. In this case the speaker 21 is mounted in a common wall 22, between a total enclosure 23 and a vented enclosure 24. Wall 25 of the vented enclosure 24, which is opposite the radiating surface of the speaker 21, has no ports. The port 26 is located in the wall 27 so that direct radiation from the loud-speaker 21 through the port 26 is not possible.

The material of construction for this embodiment is one inch plywood. The speaker has a maximum dimension of approximately eight inches. The total enclosure is one foot by one foot by nine inches, while the vented enclosure is one foot cubed. The area of the port is approximately thirteen square centimeters.

Figure 7:
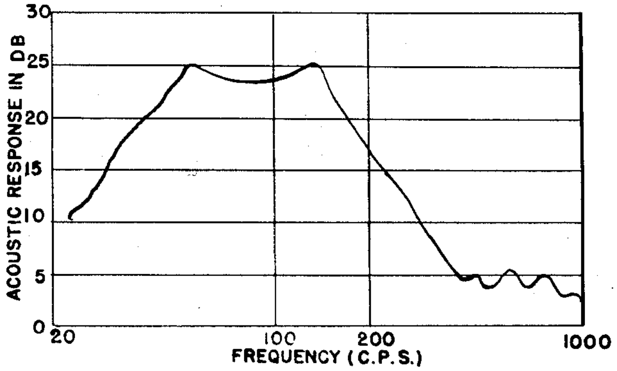
Figure 7 is a frequency response curve of the embodiment illustrated in Figure 1.

With this system there is no front radiation from the speaker. The radiation from the port 26 is a simple source radiation. As illustrated in Figure 7 there is essentially constant frequency response between the lower and upper resonant frequencies. Thus if a signal is applied at the lower resonant frequency the distortion generated will be reduced by 4 decibels for the 3rd harmonic, 12½ decibels for the 5th harmonic, 18½ decibels for the 7th harmonic and so forth.

The significance of such distortion reduction is more apparent if the values for a particular exciting frequency are given. Thus, if the exciting frequency is 100 C. P. S., the 3rd harmonic is reduced to 15.8% of the original distortion. Assuming that the original distortion of an inexpensive, small, low-quality control loud-speaker is as much as 25%, the resultant distortion using this invention would be 15.8% of 25% or less than 4%. Since 5% or less distortion is the generally accepted value for high-quality reproduction, it can be readily seen that this invention converts low-quality components into high-quality sound reproduction systems.

Figure 2:
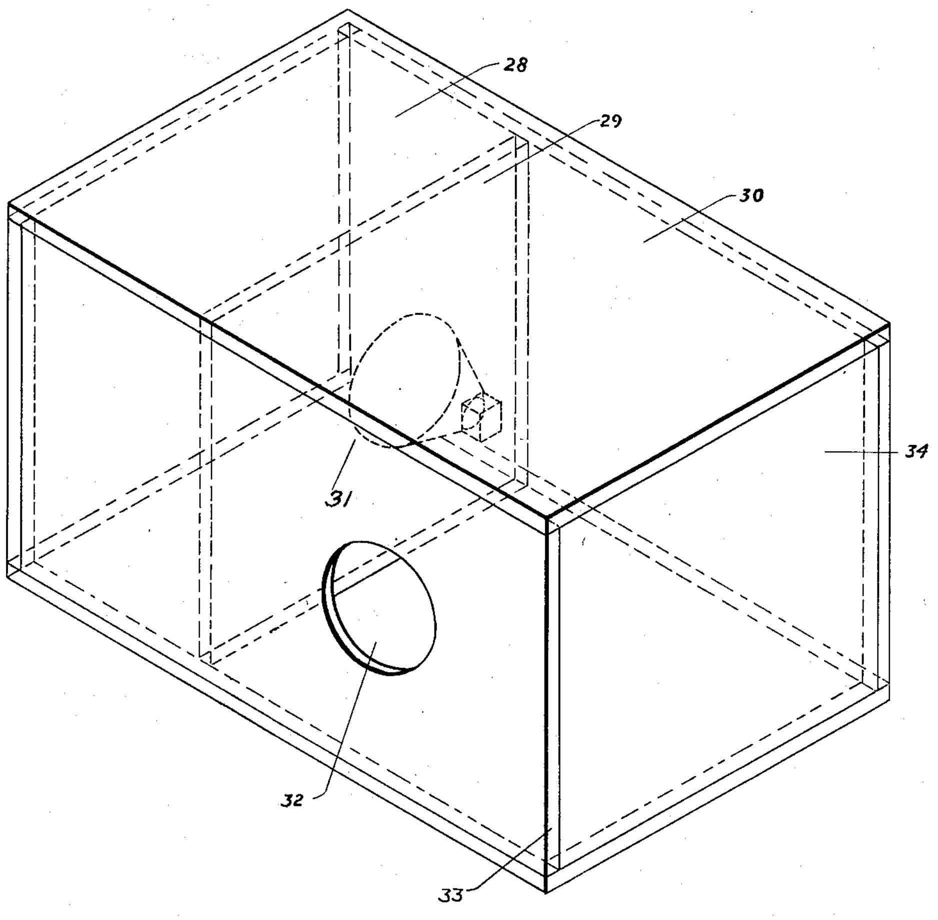
Figure 2 is an embodiment illustrating a speaker mounted in the vented enclosure and facing into the total enclosure.

Another embodiment of this invention is illustrated in Figure 2. A total enclosure 28 is shown formed from rigid walls having a common wall 29 with a vented enclosure 30. The loud-speaker 31 is mounted through the common wall 29 so that the back end of the radiating surface is housed in the vented chamber 30 while the front end of the speaker faces through the common wall 29 into the total enclosure 28. As in the previous embodiment the port 32 is located in a wall 33 which is not opposite the radiating surface of the speaker 31. The wall 34 opposite the speaker is rigid and unvented. The dimensions of the embodiment in Figure 2 are substantially identical with the embodiment in Figure 1, as is the frequency response.

Figure 3:
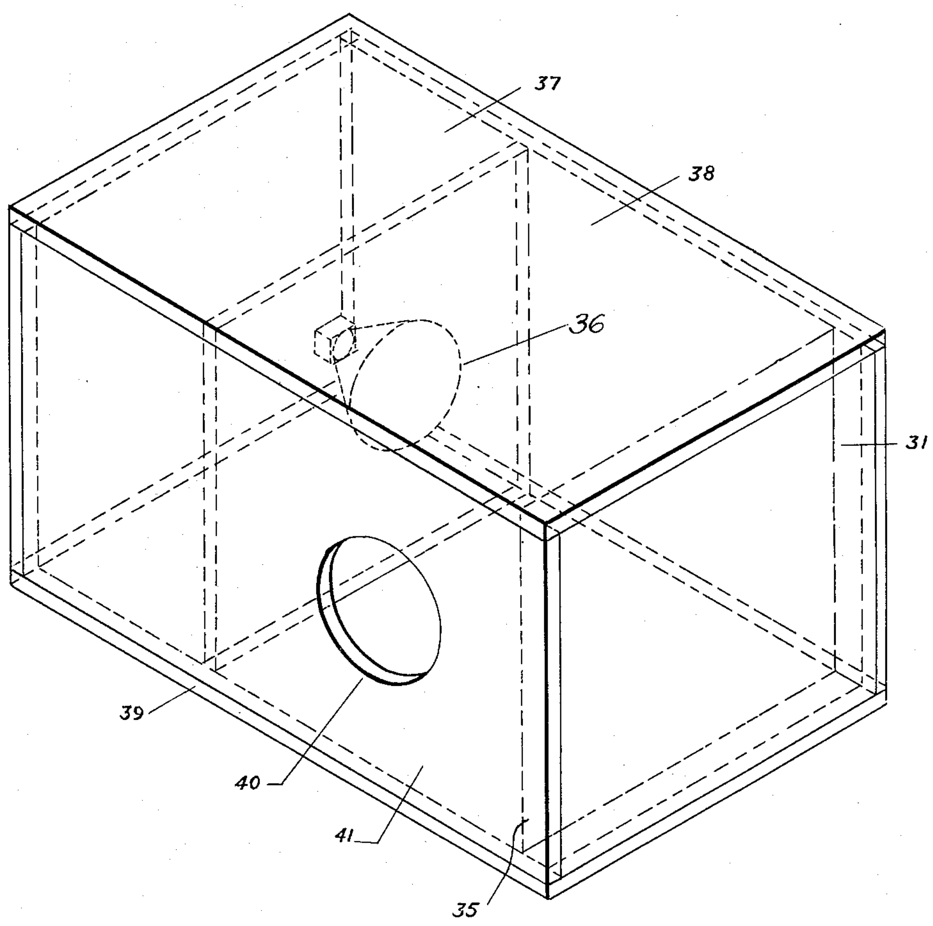
Figure 3 is an embodiment of a speaker mounted in a total enclosure and facing into an enclosure having a sound absorptive material on the wall opposite the radiating surface and a port on another wall.

Referring now to Figure 3 an embodiment is illustrated in which absorbent lining 35 covers the interior surface of the rigid wall 34 opposite the radiating surface of the loudspeaker 36. In this embodiment the rear of the loud-speaker is housed in the total enclosure 37 and faces into the vented enclosure 38 through the common wall 39. The port 40 is located in the wall 41 of the vented enclosure.

The material of construction for this embodiment is one inch plywood. The speaker has a maximum dimension of approximately eight inches. The total enclosure is one foot by one foot by nine inches, while the vented enclosure is one foot cubed. The area of the port is approximately thirteen square centimeters. The sound absorbent material used in this particular embodiment is a one inch layer of fiber-glass secured to the inner surface of the wall.

Figure 8:
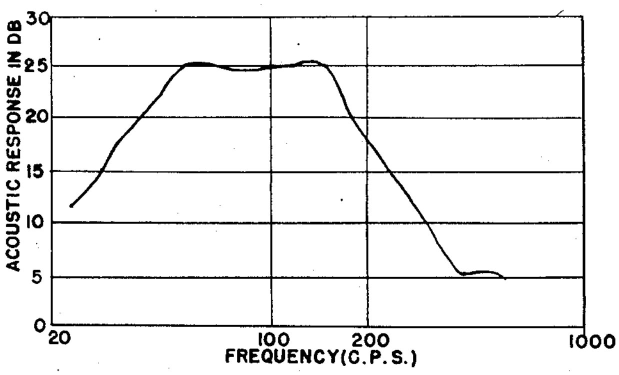
Figure 8 is a frequency response curve of the embodiment illustrated in Figure 3.

The frequency response of the embodiment illustrated in Figure 3 is illustrated in Figure 8. It can be readily seen that there is a wide low frequency range which is flat and distortionless and which breaks sharply at either end.

Figure 4:
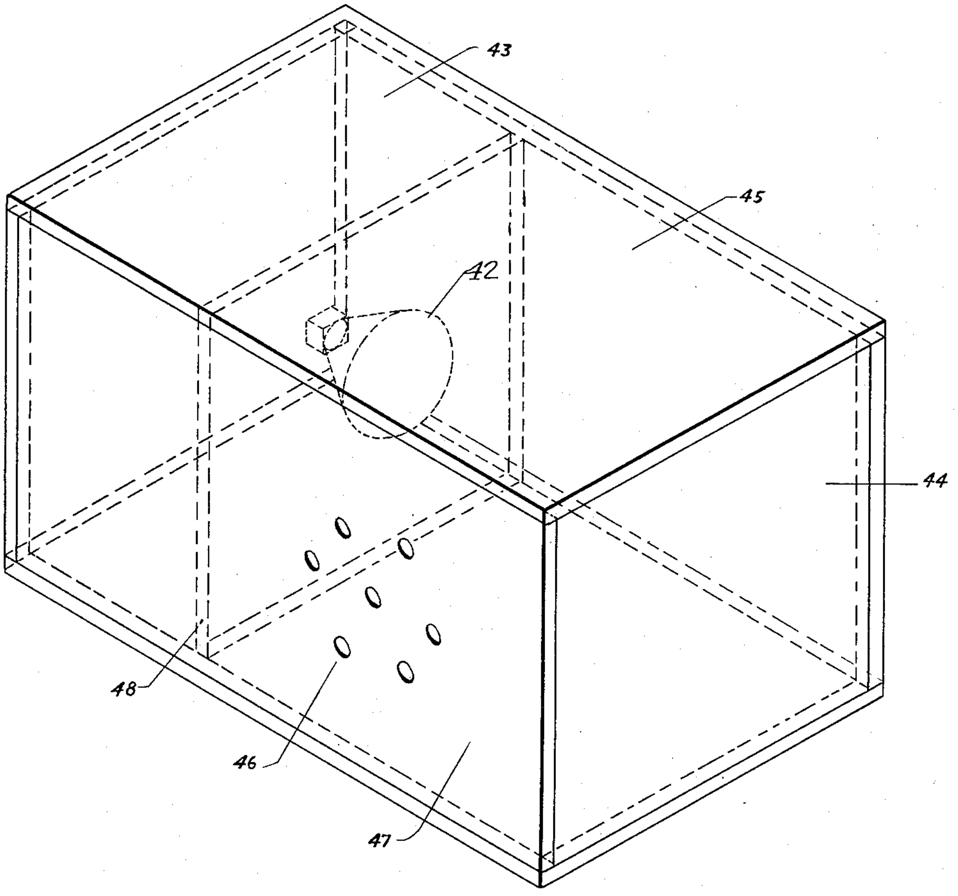
Figure 4 is an embodiment similar to Figure 1 except that the venting is provided by multiple holes in one wall.

Referring to Figure 4 still another embodiment is shown in which the loud-speaker 42 has its rear portion extending into the total enclosure 43, and faces the unlined unvented wall 44 of the vented enclosure 45. In this case the port is provided by a cluster of small holes 46 in wall 47. As in the previous embodiments the speaker is mounted through a common wall 48. The dimensions are substantially identical with the embodiment of Figure 1 except that of the holes which are approximately equal in total area to the single port of Figure 1. The frequency response of the Figure 4 embodiment is substantially the same as that of the Figure 1 embodiment.

Figure 5:
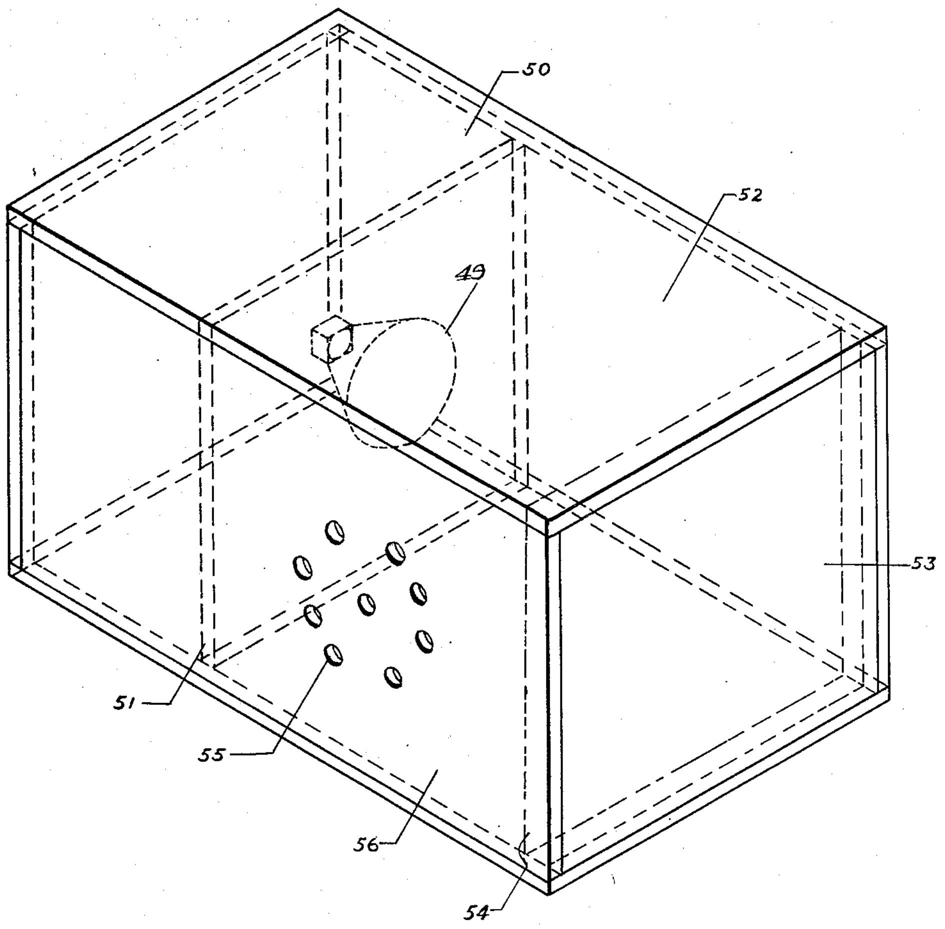
Figure 5 is a similar embodiment to Figure 3 except that the venting is provided by multiple holes in one wall.

Referring now to Figure 5 a loud-speaker system is shown in which the loud-speaker 49 has its rear portion spaced in a total enclosure 50, and projects through a common wall 51 into a vented enclosure 52. The wall 53 opposite the speaker has substantially its entire inner surface covered with sound absorbent material 54. The port is provided by a cluster of small holes 55 in wall 56. The dimensions and frequency response are substantially identical with the embodiment of Figure 3 except that the total area of the holes is approximately equal to the area of the port in Figure 3.

Figure 6:
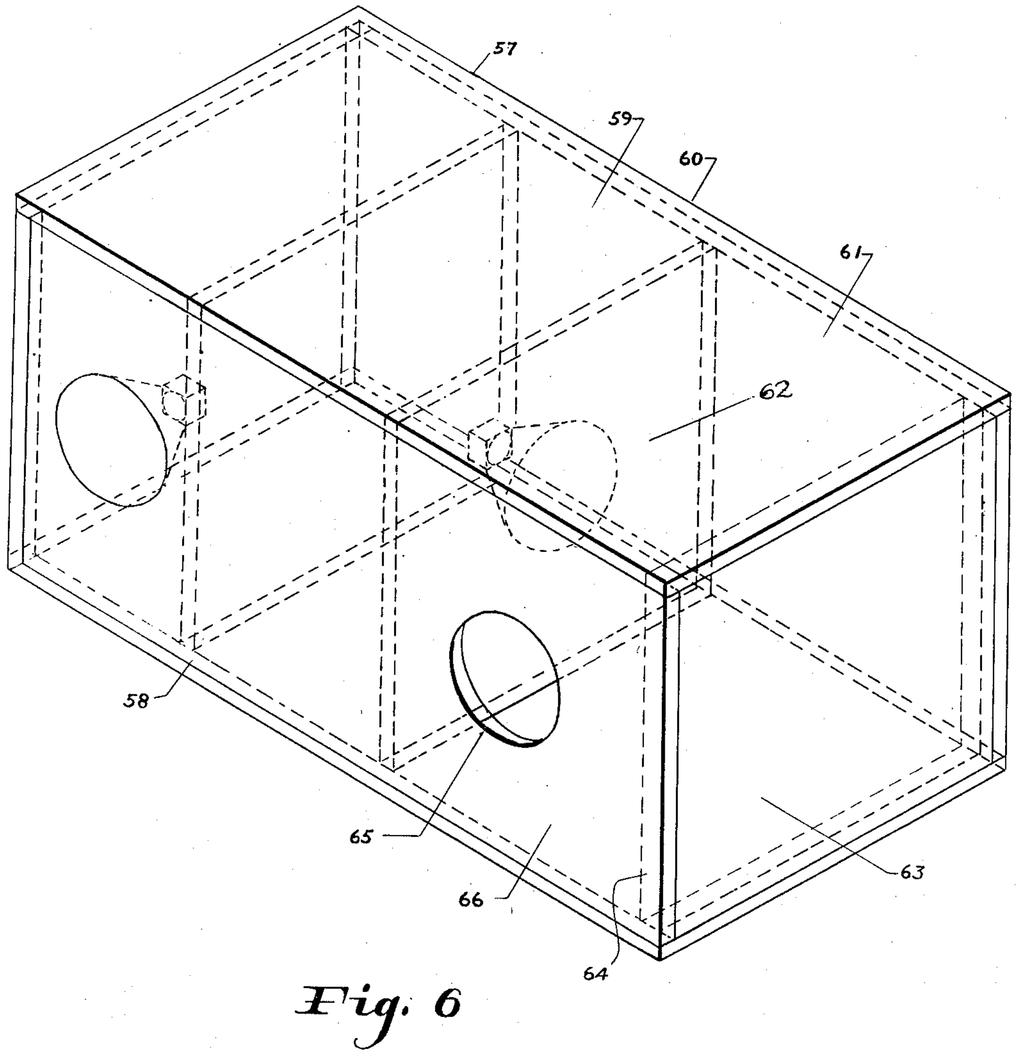
Figure 6 is a broad range frequency system utilizing the combination of an acoustically separate direct radiator for medium and high frequencies and the system of Figure 3 for low frequencies.

A combination of loud speaker systems covering the entire audio range is provided in Figure 6. A total enclosure 57 has a speaker 58 opening into the air and provides the medium and high frequencies. Another total enclosure 59 has a common wall 60 with a vented enclosure 61 and has a speaker 62 facing through this common wall 60 into the vented enclosure 61. The wall 63 opposite the speaker 62 has its inner surface covered with a sound absorbent lining 64. The port 65 for the chamber 61 is provided in wall 66. Compartment 57 is acoustically separated from the other two compartments so that from speaker 58 are emitted the medium and high frequencies while from port 65 are emitted the low frequencies. Being closely spaced these two outlets 58 and 65 combine their outputs to make an effectively single source giving distortionless reproduction over an extremely wide audio range of frequencies.

The material of construction for this embodiment is one inch plywood. The vented chamber is one foot by one foot by one foot. The high frequency enclosure is one foot by one foot by eight inches. The low frequency total enclosure is one foot by one foot by nine inches. The low frequency port has an approximate area of thirteen square centimeters. The low frequency speaker has a maximum dimension of eight inches. The high frequency speaker has a maximum dimension of six inches. Both speakers are of the cone-coil type.

Figure 9:
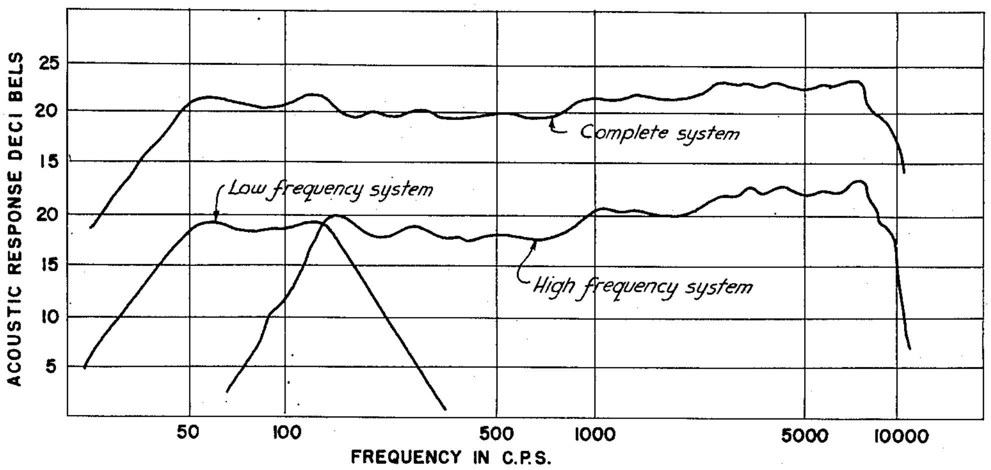
Figure 9 is a frequency response curve of the embodiment illustrated in Figure 6.

The response for the system illustrated in Figure 6 is shown in Figure 9 wherein it can be seen that the low frequency system has a substantially flat response between 50 and 140, while the medium high frequency system has a flat response between 140 and 10,000 cycles.

Figure 10:
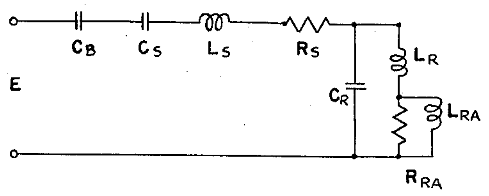
Figure 10 is an analog circuit of the components of this invention.

The practice of this invention is further aided by reference to Figure 10 in which an analog circuit is shown. $C_b$ represents the compliance of a closed box; $C_s$, $L_s$, $R_s$, represents the compliance, mass and resistance of the loud-speaker; while $C_r$ represents the compliance of a vented enclosure. $L_r$ indicates the mass of air in the port, while $L_{ra}$ and $R_{ra}$ represent the radiation mass and the radiation resistance of the port.

A detailed example of calculations leading to proper tuning of the vented enclosure is given below, but it should be clearly understood that such calculations are not essential to the practice of this invention but merely aid in selection of proper dimensions.

*Problem.*—To design a 60–160 C. P. S. flat response, narrow band pass acoustic filter.

*Solution.*—In this example I utilize a coil-cone speaker weighing six grams, having a maximum cone diameter of eight inches and an effective maximum free cone diameter of sixteen centimeters. The speaker is mounted through one wall of a totally enclosed one-foot rigid-wall cube having one inch plywood walls. I have previously determined by appropriate acoustic measurements that the natural resonant frequency of the speaker alone is 60 C. P. S. The total air mass of the speaker is 4 grams, but if only one side of the speaker is reacting, as is the case in this invention, the air mass is 2 grams.

The speaker inductance, $L_s$, is equal to the effective speaker air-mass, 2 gms. plus the weight of the speaker, 6 gms., divided by the area of maximum cross-section of the cone $$\left(\pi\frac{d^2}{4}\right)$$

The compliance of the speaker, $C_s$, is equal to $$\left(\frac{1}{2\pi f_0}\right)^2\frac{1}{L_s}$$

The total compliance $C_T$ of speaker mounted in the box is equal to $$\frac{C_BC_s}{C_B+C_s}=\frac{\frac{V}{\rho c^2}C_s}{\frac{V}{\rho c^2}+C_s}=C_T$$

where $C_B$ is compliance of box, V is volume of box, $\rho$ is density of air, $c$ is speed of sound in air.

Then, by appropriate extension:

$L_s=2\times10^{-4}$ gms./cm.$^4$
$C_s=.028$ cm.$^4$ Sec.$^2$/gm.
$C_T=.0116$ cm.$^4$ Sec.$^2$/gm.

The new resonant frequency of mounted speaker $$f_0{}^1=\frac{1}{2\pi\sqrt{L_sC_T}}=104 \text{ C. P. S.}$$

By reference to Figure 11, which is a plot of band width against the inductance ratio $$(L_r/L_s)$$

of the tuned, vented speaker, it is determined that $$\frac{L_R}{L_s}=0.95$$

for the 62–160 C. P. S. band. Since, if the resonant frequencies are matched, as in this invention, $$\frac{C_T}{C_R}=\frac{L_R}{L_s}=0.95$$

there is now sufficient information to calculate the volume and port area of a vented enclosure made of one-inch plywood. Instead of using Figure 11 the equation:

$$\left(\frac{K^2-1}{K}\right)^2=\frac{L_R}{L_s}$$

can be used, where $$K=\frac{\text{upper frequency of the system}}{\text{mounted resonance frequency in closed box}}=\frac{160}{104}=1.6$$

Now we obtain the inductance $L_R$, compliance $C_R$, volume $V_R$, and port area $S_h$, of the desired vented enclosure as follows:

$$\frac{C_T}{C_R}=\frac{L_R}{L_s}=0.95$$

$$V_R=1.05\rho c^2 C_T=0.95 \text{ cubic feet}$$

$$L_R=\frac{\rho l}{S_h}$$

$$S_h=\frac{\rho l}{L_R}=\frac{\rho l}{0.95 L_s}=\frac{(1.2)\,(10)^{-3}\,(2.54)}{(0.95)(2.0)(10)^{-4}}$$

$$S_h=12.8 \text{ square centimeters}$$

The lower frequency is $$\frac{f_0{}^1}{1.6}=62 \text{ C. P. S.}$$

and the upper frequency is $1.6 f_0{}^1=160$ C. P. S with a 12 db./ octave drop at both ends. If multiple holes are desired instead of a single port, the width of each hole is determined by dividing 12.8 $Cm^2$ by the number of desired holes.

This invention not only substantially eliminates the self-generated harmonic distortion but also frequency discrimination. There is practically no cancellation at the lower resonant frequency and no augmentation at the upper resonant frequency. Using electrical terminology embodiments of this invention function as narrow band pass filters.

As a result of these properties this invention allows for the construction of much smaller, high-quality reproduction systems than have been hitherto described. Whereas, previously described high quality systems used expensive large coaxial speakers or horns in enclosure volumes of ten or more cubic feet, high quality systems can be made in accordance with this invention using small inexpensive speakers in total enclosure volumes of as low as 1½ cubic feet.

It should be clearly understood that while much mention has been made of cone-coil speakers, that any type of loud-speaker can be used in this invention, including magnetic-diaphragm, condenser and magnetic-armature types.

I claim:

1. A sound reproducing system comprising a loud-speaker which is mounted through one wall of an otherwise totally enclosed rigid wall chamber and opens directly into a second rigid wall chamber; said second chamber having a passage to the outside air and being so constructed as to be acoustically tuned to from one-half to twice the resonant frequency of the combination of said total enclosure and said loud-speaker.

2. A sound reproducing system comprising a loud-speaker which is mounted through one wall of an otherwise totally enclosed rigid wall chamber and opens directly into a second rigid wall chamber; said second chamber having a passage to the outside air and being so constructed as to be acoustically tuned to from one-half to twice the resonant frequency of the combination of said total enclosure and said loud-speaker; the square root of the area of the opening of said passage being less than the volume of said second chamber divided by said area.

3. A sound reproducing system comprising a loud-speaker which is mounted through one wall of an otherwise totally enclosed rigid wall chamber and opens directly into a second rigid wall chamber; said second chamber having a passage to the outside air and being so constructed as to be acoustically tuned to from one-half to twice the resonant frequency of the combination of said total enclosure and said loud-speaker; the wall of said second chamber opposite said speaker being unvented.

4. A sound reproducing system comprising a loud-speaker which is mounted through one wall of an otherwise totally enclosed rigid wall chamber and opens directly into a second rigid wall chamber; said second chamber having a passage to the outside air and being so constructed as to be acoustically tuned to from one-half to twice the resonant frequency of the combination of said total enclosure and said loud-speaker; the wall of said second chamber opposite said speaker being unvented and lined on its inner surface with a sound absorbent material.

5. In a sound reproducing system, a low frequency source cooperating with an acoustically separate high frequency source to provide an effectively single wide-frequency source; said low-frequency source comprising a loud-speaker which is mounted through one wall of an otherwise totally enclosed rigid wall chamber and opens directly into a second rigid wall chamber; said second chamber having a passage for communication with the outside air and being so constructed as to be acoustically tuned to from one-half to twice the resonant frequency of the combination of said total enclosure and said loud-speaker.

6. In a sound reproducing system, the combination of a three-compartmented rigid wall chamber and two loud-speakers mounted therein; one of said compartments being a total enclosure having one of said speakers mounted in a wall thereof and opening to the atmosphere; the other two compartments having a common wall through which is mounted said other speaker; one of said latter compartments being an otherwise total enclosure; the remaining compartment having a passage to the outside air and being so constructed as to be acoustically tuned to from one-half to twice the resonant frequency of the combination of said latter total enclosure and said latter loudspeaker.

References Cited in the file of this patent

UNITED STATES PATENTS

| Number | Name | Date |
|---|---|---|
| 2,210,477 | Benecke | Aug. 6, 1940 |